(12) United States Patent
Klassen

(10) Patent No.: US 6,890,045 B2
(45) Date of Patent: May 10, 2005

(54) SWITCHGEAR CABINET WITH RACK, PANELING AND BASE

(75) Inventor: Samuel Klassen, Haiger (DE)

(73) Assignee: Rittal RCS Communication, Haiger (DE)

(*) Notice: Subject to any disclaimer, the term of this patent is extended or adjusted under 35 U.S.C. 154(b) by 309 days.

(21) Appl. No.: 10/102,567

(22) Filed: Mar. 20, 2002

(65) Prior Publication Data

US 2002/0170810 A1 Nov. 21, 2002

(30) Foreign Application Priority Data

Mar. 21, 2001 (DE) .......................................... 101 13 888

(51) Int. Cl.⁷ ............................................. A47B 91/00
(52) U.S. Cl. ................................. 312/351.3; 312/351.1
(58) Field of Search .......................... 312/257.1, 265.1, 312/265.2, 265.3, 265.4, 351.1, 351.3, 351.4, 351.5, 351.7; 361/724, 727; 211/26

(56) References Cited

U.S. PATENT DOCUMENTS

| | | | | |
|---|---|---|---|---|
| 2,526,747 A | * | 10/1950 | Heilig, Jr. ................... | 312/329 |
| 2,535,528 A | * | 12/1950 | Brodbeck ................... | 126/305 |
| 2,667,401 A | * | 1/1954 | Knuth ......................... | 312/351 |
| 3,819,245 A | * | 6/1974 | Tacke et al. ............. | 312/351.7 |
| 4,118,083 A | * | 10/1978 | Lackey et al. .............. | 312/100 |
| 5,695,263 A | * | 12/1997 | Simon et al. ............. | 312/265.4 |
| 5,857,757 A | * | 1/1999 | Bieker et al. ............. | 312/351.3 |
| 6,069,787 A | * | 5/2000 | Wilkie, II ................... | 361/605 |
| 6,164,460 A | * | 12/2000 | Reuter ......................... | 211/26 |
| 6,401,940 B1 | | 6/2002 | Hartel et al. ................. | 211/26 |

FOREIGN PATENT DOCUMENTS

| | | | | |
|---|---|---|---|---|
| AU | | 248586 | * 12/1963 | .............. 312/351.3 |
| WO | WO 99/48179 | | * 9/1999 | |

OTHER PUBLICATIONS

U.S. Appl. No. 10/102,563, filed Mar. 20, 2002, Klassen et al., Fittings for Mounting on Frame Members of a Switchgear Cabinet Frame.
U.S. Appl. No. 10/102,178, filed Mar. 20, 2002, Klassen et al., Switchgear Cabinet Including Framework and Covering Members.
U.S. Appl. No. 10/102,562, filed Mar. 20, 2002, Klassen et al., Switchgear Cabinet Including Framework and Covering Members.
U.S. Appl. No. 10/102,600, filed Mar. 20, 2002, Klassen et al., Switchgear Cabinet With a Rack and Panel Elements.

* cited by examiner

Primary Examiner—James O. Hansen
(74) Attorney, Agent, or Firm—Pauley Petersen & Erickson

(57) ABSTRACT

A switchgear cabinet with a rack, placed with an underside on a base and connected therewith, and having a lower side closed by a bottom plate. The cost outlay for parts and assembly can be considerably reduced and made easier if on all four sides of the bottom plate the base is formed by a plurality of folds oriented toward the underside, wherein folded sections extend parallel with respect to the bottom plate and define a support surface. Further folded sections are supported on the underside of the bottom plate and/or are connected therewith, and the open underside of the rack is connected with the unit including the bottom plate and the base through the base and/or the bottom plate.

17 Claims, 1 Drawing Sheet

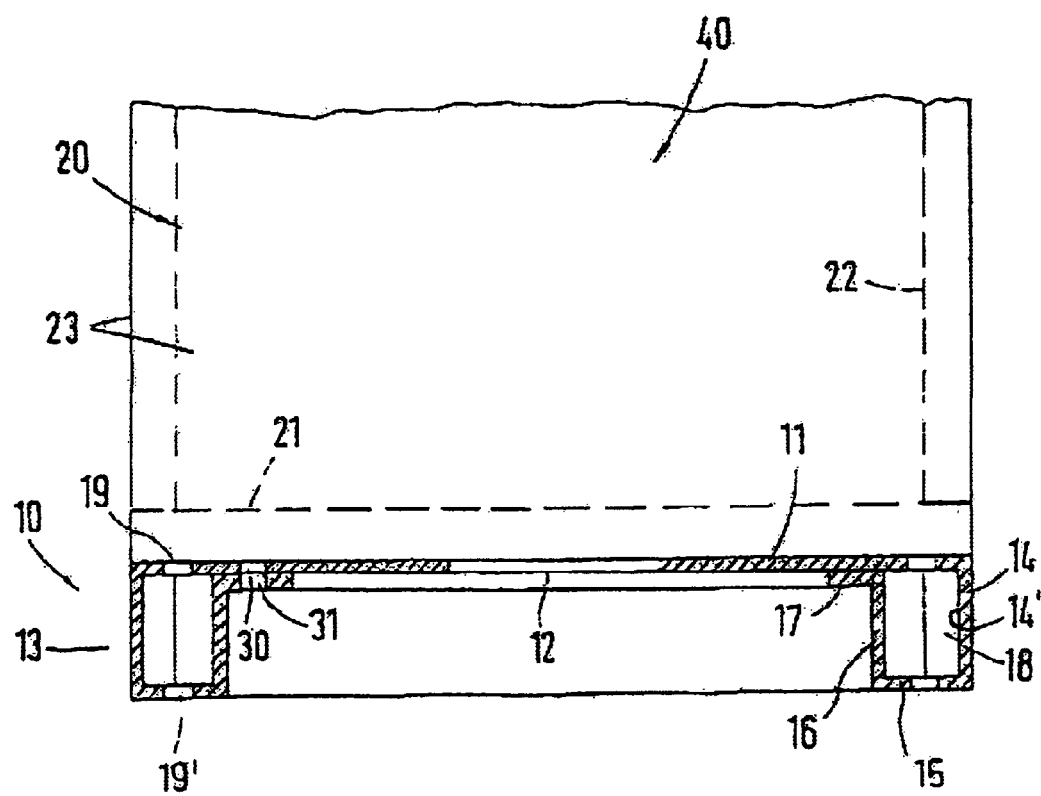

SWITCHGEAR CABINET WITH RACK, PANELING AND BASE

BACKGROUND OF THE INVENTION

1. Field of the Invention

This invention relates to a switchgear cabinet with a rack, which is placed with an underside on a base and is there connected, and with a lower side closed by a bottom plate.

2. Description of Related Art

Switchgear cabinets have bases of various configurations, which are mostly assembled from four frame legs. In this case the frame legs are often connected by additional corner elements in corner areas. Such a base requires a considerable cost outlay for parts and assembly. Also, it is necessary to connect this base with a bottom plate, which closes off an open underside of the switchgear cabinet and which further increases the cost outlay for parts and assembly.

SUMMARY OF THE INVENTION

It is one object of this invention to considerably simplify and reduce the cost outlay for parts and assembly in connection with a switchgear cabinet.

In accordance with this invention, this object is achieved by, on at least two opposing sides of the bottom plate, the base being formed by a plurality of folds oriented toward the underside. Folded sections extend parallel with respect to the bottom plate and define a support surface. Further folded sections are supported on the underside of the bottom plate and/or are connected therewith, and the open underside of the rack is connected with the unit including the bottom plate. The base, through the base and/or the bottom plate, is sealed.

With this embodiment the bottom plate and the base form a one-piece unit, which can be produced cost-effectively and with little cost outlay for labor, as a stamped-and-bent element. It is possible to prefabricate the switchgear cabinet with the rack independently of this unit and to place it on the unit of the bottom plate and the base and to there connect it.

If the bottom plate has at least one opening as a cable introduction passage, it is possible to introduce connecting cables and the like into the switchgear cabinet interior, wherein cable introduction elements can also be placed in the opening of the bottom plate.

In accordance with one embodiment, the open underside of the rack is closed off by a horizontal bottom frame, to which vertical frame legs are attached in the four corner areas.

This is a benefit to the manufacture of the switchgear cabinet with the rack, and possibly the paneling of the remaining sides, as a prefabricated cabinet unit. The connection between the unit including the bottom plate and the base and the cabinet unit can be simply performed because the bottom plate and the folded sections defining the support surface of the base have vertically aligned fastening bores.

So that the base folded on the bottom plate has sufficient stability, the folds forming the base have folded end sections which, oriented toward the center of the bottom plate, rest against and are connected with the underside of the bottom plate. In this case, the folded end sections can be easily connected with the bottom plate and included in the cabinet unit because the folded end sections and the bottom plate have vertically aligned fastening bores.

For further stabilization of the base, it is possible that the folds meet each other in the area of the corners of the base on the vertical levels of the median line of the sides, which respectively meet each other at right angles, and are connected with each other, preferably welded.

In accordance with a further embodiment, the outer corners of the base can be closed off because on two oppositely located sides of the base the outer folds, which adjoin the bottom plate, support fastening flanges bent at right angles and rest against the insides of the outer folds, bent at right angles, of the adjoining sides and are connected with these, preferably welded.

BRIEF DESCRIPTION OF THE DRAWING

This invention is explained in greater detail in view of an embodiment shown in the drawing, in a partial cross-sectional view.

DESCRIPTION OF PREFERRED EMBODIMENTS

As shown in a sectional view area in the lower area of the drawing, a one-piece unit is created on a bottom plate 11 with a base 13 formed by folds 14 to 18 oriented toward the underside of the bottom plate 11, on which a prefabricated cabinet unit 40, open at the bottom, can be placed and connected with the unit 10.

In the embodiment shown, on all four sides of the bottom plate 11 the base 13 comprises four folds 14, 15, 16 and 17, which are placed at right angles with respect to each other. In this case the folded sections 15, which extend parallel with the bottom plate 11, form the support surface of the base 13. The folded end sections 17 are oriented toward the center of the bottom plate 11, rest against the underside of the bottom plate 11, and can be connected with the bottom plate 11 and with the cabinet unit 40 if the folded end sections 17 and the bottom plate 11 have vertically aligned fastening bores 30 and 31. The connection can also be provided via aligned bores 19 and 19', which are cut into the bottom plate 11 and the folded sections 15.

The cabinet unit 40 has a cuboid rack 20, with an open underside closed off by a horizontal frame 21 with frame legs. The frame 21 can be assembled from four frame legs. The frame legs can also be permanently connected with each other. The unit 10 includes the bottom plate 11 and the base 13 and can be screwed together with the frame 21 of the rack 20. Vertical frame legs 22 are attached to the frame 21 in the four corner areas. The vertical sides and the open top of the rack 20 are closed off by panel elements 23. In this case a vertical panel element 23 is embodied as a cabinet door and is hinged on the rack 20 and can be locked or released for opening.

The folds 14 to 17 meet in the corner areas of the base 13 on the vertical levels of the median line between the sides of the base 13, which respectively meet at right angles and can also be connected with each other there, preferably welded together.

The connecting outer folds 14 can have fastening flanges 18, bent in at right angles, on two oppositely located sides of the bottom plate 11, which rest against the insides 14' of the outer folds 14, which meet at right angles at the sides joining them at right angles and are there connected in order to cover the vertical corner edges of the base 13 and to increase the stability of the base 13.

The fastening screws used for connections are inserted through the bores 19' of the folded sections 15 and rest with the screw heads against the underside of the bottom plate 11, and the folded end sections 17 rest with the screw heads directly around the bores 30 in the folded end sections 17. The fastening screws can also be introduced into the interior of the switchgear cabinet via aligned fastening receivers of the frame 21, at these fastening locations.

The bottom plate 11 can have at least one opening 12 for introducing electrical cables, supply lines and the like in the center area free of the base 13. Cable introduction elements and the like can also be inserted into the opening 12.

German Patent Reference 101 13 888.1, the priority document corresponding to this invention, and its teachings are incorporated, by reference, into this specification.

What is claimed is:

1. In a switchgear cabinet having a rack with an underside placed on and connected with a base, and wherein a lower side is closed by a bottom plate, the improvement comprising:
   on at least two opposing sides of the bottom plate (11) the base (13) formed by a plurality of folds oriented toward an underside of the bottom plate (11), the plurality of folds forming a folded section (15) extending parallel with respect to and spaced from the plate (11) to define a support surface and a further folded end section (17) at least one of supported on and connected with the underside of the bottom plate (11), wherein an open underside of the rack (20) is connected with the bottom plate (11) and wherein the bottom plate (11) and the folded sections (15) defining the support surface of the base (13) have vertically aligned fastening bores (19, 19' for fastening the base (13) to the rack (20).

2. In the switchgear cabinet in accordance with claim 1, wherein the bottom plate (11) has at least one opening (12) forming a cable introduction passage.

3. In the switchgear cabinet in accordance with claim 2, wherein the open underside of the rack (20) is closed by a horizontal bottom frame (21) to which vertical frame legs (22) are attached in the four corner areas.

4. In the switchgear cabinet in accordance with claim 3, wherein the rack (20) and remaining paneling (23) form a prefabricated cabinet unit (40).

5. In the switchgear cabinet in accordance with claim 4, wherein the bottom plate (11) and the folded sections (15) defining the support surface of the base (13) have vertically aligned fastening bores (19, 19').

6. In the switchgear cabinet in accordance with claim 5, wherein the folded end sections (17) are oriented toward the center of the bottom plate (11).

7. In the switchgear cabinet in accordance with claim 6, wherein the folded end sections (17) and the bottom plate (11) have vertically aligned second fastening bores (30, 31).

8. In the switchgear cabinet in accordance with claim 7, wherein the plurality of folds (14 to 17) meet each other near corners of the base (13) on vertical levels of a median line of sides, which respectively meet each other at right angles, and are connected with each other.

9. In the switchgear cabinet in accordance with claim 8, wherein on two oppositely located sides of the base (13) outer folds (14) adjoin the bottom plate (11) and support fastening flanges (18) bent at right angles and rest against the insides (14') of the outer folds (14) bent at right angles of the adjoining sides and are there connected.

10. In the switchgear cabinet in accordance with claim 9, wherein the unit (10) of the bottom plate (11) and the base (13) is produced as a stamped-and-bent part.

11. In the switchgear cabinet in accordance with claim 1, wherein the open underside of the rack (20) is closed by a horizontal bottom frame (21) to which vertical frame legs (22) are attached in the four corner areas.

12. In the switchgear cabinet in accordance with claim 1, wherein the rack (20) and remaining paneling (23) form a prefabricated cabinet unit (40).

13. In the switchgear cabinet in accordance with claim 1, wherein the folded end sections (17) are oriented toward the center of the bottom plate (11).

14. In the switchgear cabinet in accordance with claim 13, wherein the folded end sections (17) and the bottom plate (11) have vertically aligned second fastening bores (30, 31).

15. In the switchgear cabinet in accordance with claim 1, wherein the folds (14 to 17) meet each other near corners of the base (13) on vertical levels of a median line of sides, which respectively meet each other at right angles, and are connected with each other.

16. In the switchgear cabinet in accordance with claim 1, wherein on two oppositely located sides of the base (13) outer folds (14) adjoin the bottom plate (11) and support fastening flanges (18) bent at right angles and rest against the insides (14') of the outer folds (14) bent at right angles of the adjoining sides and are there connected.

17. In the switchgear cabinet in accordance with claim 1, wherein the unit (10) of the bottom plate (11) and the base (13) is produced as a stamped-and-bent part.

* * * * *